J. E. CLARK.
PROCESS OF TREATING VEGETABLE MATERIAL FOR PAVING OR OTHER PURPOSES.
APPLICATION FILED DEC. 5, 1914.
1,364,037.
Patented Dec. 28, 1920.
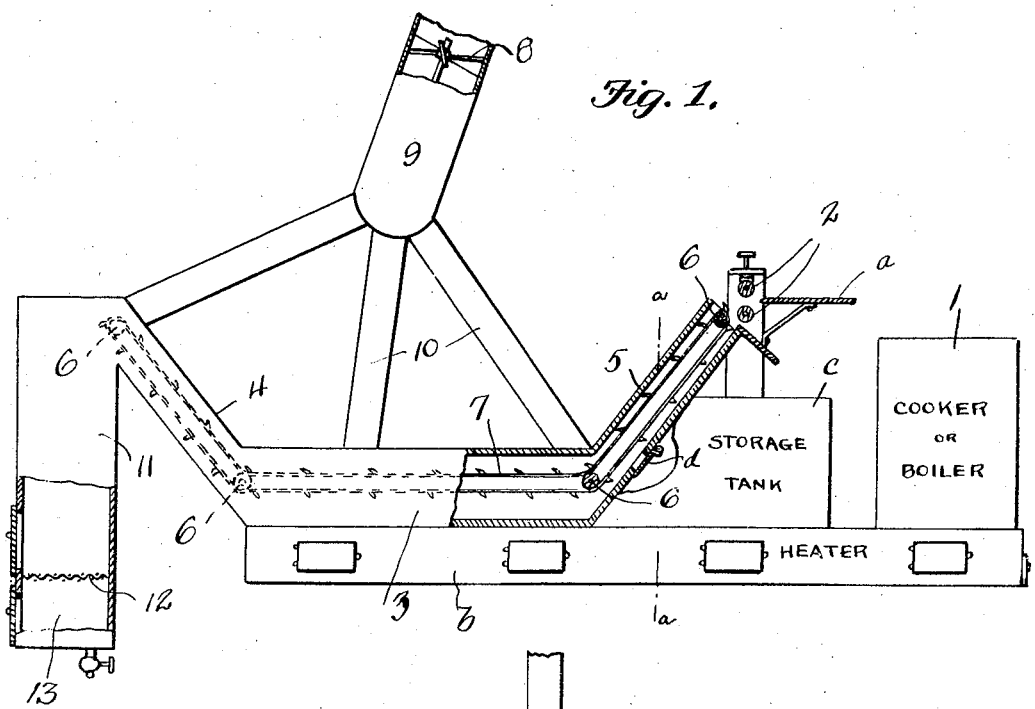
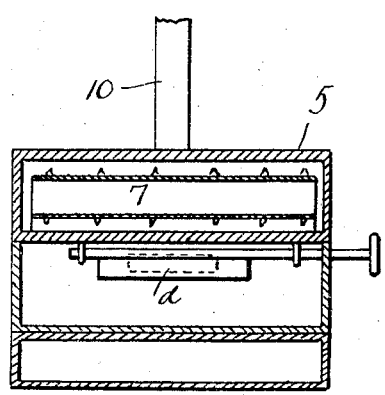

UNITED STATES PATENT OFFICE.

JOHN E. CLARK, OF TORONTO, ONTARIO, CANADA, ASSIGNOR TO THE CLARK PAVING CORPORATION, OF NEW YORK, N. Y., A CORPORATION OF DELAWARE.

PROCESS OF TREATING VEGETABLE MATERIAL FOR PAVING OR OTHER PURPOSES.

1,364,037.  Specification of Letters Patent.  Patented Dec. 28, 1920.

Application filed December 5, 1914. Serial No. 875,682.

*To all whom it may concern:*

Be it known that I, JOHN E. CLARK, a subject of the King of Great Britain, residing at Toronto, county of York, Province of Ontario, Dominion of Canada, have invented certain new and useful Improvements in Processes for Treating Vegetable Material for Paving or other Purposes, of which the following is a specification.

This invention relates to a process of treating fibrous vegetable material.

The principal object of the invention is to treat fibrous vegetable matter so as to render the same flexible, durable and efficient for paving and other purposes.

I have other objects in view, as will be apparent from the following detailed description, and it will be understood that the accompanying drawings are furnished mainly for the purpose of illustrating one embodiment of apparatus which may be used for carrying out the process. I do not wish to be understood as limiting myself to the particular apparatus illustrated, for, while the same is particularly adapted for the purpose, other apparatus may be employed to serve the purpose equally well.

In the accompanying drawings:

Figure 1 is a view illustrating partly in section and partly in conventional form an apparatus particularly serviceable for carrying out the steps of the present process.

Fig. 2 is a sectional view on the line *a—a* of Fig. 1.

In carrying my method into practice, I first take straw, corn stalks, sugar cane or other fibrous vegetable matter, and place the same in a suitable cooker or boiler 1 in which it is cooked or boiled in the presence of water. The vegetable matter in some instances will be shredded, while in other instances it is not shredded and it may be of long or short length, according to the requirements, for, in some instances, especially for paving purposes, the material will be formed in layers, and one layer is preferably composed mainly of vegetable matter of long length while another layer is preferably composed mainly of fibrous material of short length.

After cooking or boiling the material a predetermined time in a cooker or boiler 1, it may be placed upon a platform *a* and from there it is passed between rollers 2 which effect extraction of juices and moisture from the material. The juices thus extracted may be used as a by-product for fertilizing or other purposes.

The material being cooked or boiled in the presence of water, it is saturated with water when removed from the cooker or boiler. By subjecting the wet or saturated fibrous material to pressure, surplus moisture is removed from the fibrous material. Although the surplus moisture is removed, the fibrous material remains in a wet condition and in this wet condition, it is subjected to a bath of asphalt, bitumen, pitch or other solution capable of serving both as a binder and as a preservative and of such nature as to render the material impervious to moisture. In the use of the term "wet" fiber, applicant means fiber containing moisture in quantity in excess of atmospheric moisture or in quantity of moisture which the fiber would take in under ordinary atmospheric conditions, and also in excess of a partial drying of the wet fiber subsequent to submersion of the fiber in water during the cooking or boiling process. After applicant subjects the wet fiber to pressure to remove surplus moisture, the fiber is in as wet a condition as prior to the removal of the surplus moisture, as should be well understood. To this end, there is illustrated a vat 3 to contain the solution and provided with upwardly directed end portions 4 and 5.

Mounted on a plurality of rollers 6 journaled in the vat 3 is an endless or other conveyer 7. This conveyer 7 preferably has one end arranged adjacent said rollers 2 at the outer end of the upwardly directed portion 5 of the vat 3 so that as the material passes from between said rollers 2 it may be taken by the endless conveyer 7 down into the vat 3 and subjected to the action of the binding and preservative material.

The binding and preservative agent contained in the vat 3 is maintained at a sufficiently hot temperature, say for instance, 200° F. to 400° F., to evaporate any moisture that remains in the material after the same has passed between the rollers 2. The heat is furnished by any character of heater *b* which is preferably of such size or structure as to extend entirely under the vat 3 and also under the cooker 1, there being a storage tank *c* between the cooker and vat in which the binding and preservative material is stored and maintained hot by said heater ready for use in the vat. The stored material may be let into the vat 3 in a hot condition by way of a valve d. The heat under the vat, storage tank and the cooker may be regulated in any suitable manner, the heater shown being merely to conventionally illustrate the apparatus for carrying out the present process.

The evaporation of the moisture creates steam in the pores of the material, opening up the pores, and the steam thus generated is preferably taken from the vat 3, as are also vaporous impurities which have been separated from the material, incident to the subjection of the same to the bath, preferably by suction. For instance, a fan 8 may be journaled in a casing 9 and operated in any suitable manner. Passages 10 communicate with the chamber 9 and the vat 3 so that, as the fan 8 is operated, the suction results in lifting the steam and foreign vapors out of the vat 3 and consequently away from the material. This step of creating a suction in the vat 3 to withdraw the impure vapors is accomplished during the interval of time in which the material is being conveyed by said conveyer 7 through the vat.

The material thus treated is deposited by the conveyer 7 into a receptacle 11 which preferably has a foraminated partition 12 on which the material is deposited and through which surplus binding and preservative material which separates from the material may pass into the compartment 13 of the receptacle 11 and from which it may be removed in any suitable manner and for any purpose. The material in the receptacle 11 above the foraminated partition 12 may be removed therefrom for paving or other purposes and, when used for paving purposes in particular, it is preferably removed from the receptacle 11 in a hot condition and placed on the roadway and rolled or otherwise compressed and permitted to harden.

The material thus formed and treated in the manner stated results in a sheet, block or other product possessing the requisite flexibility particularly required for paving purposes. The finished product is not only yieldable but it is dustless, sanitary, moisture-proof and non-slippery and is compose for the most part of waste products.

Where the material is of long length and treated in the manner stated, by the time it leaves the receptacle 11 it contains substantially sixty-six and two-thirds per cent. long coarse graded straw or other fiber by weight to substantially thirty-three and one-third per cent. asphalt or other binding and preservative agent. Where the material thus treated is composed of short fibrous material, the finished material upon reaching the receptacle 11 preferably contains substantially forty per cent. of asphalt to sixty per cent. short graded fibers mixed with fireproof material, and the fireproof material, which is preferably asbestos, may be added, particularly when the short fibered material is to be used for surfacing purposes on pavements. The fireproof material is preferably added while the material is in a state of porosity and either shortly before the material reaches the receptacle 11 or immediately upon the same reaching that point, any suitable means being employed for proper mixing.

After the material is treated in the manner hereinbefore described, it is rolled in single layers or in a plurality of superimposed layers or otherwise compressed to form pavements or the like.

What is claimed:

1. The herein described process which consists in carrying wet fibrous material through a vat containing a hot binding and preservative agent with the material submerged in the binding and preservative agent, so as to convert the moisture in the material into steam and to impregnate the material with the hot binding and preservative agent.

2. The herein described process of treating fibrous vegetable material, which consists in subjecting the same to a cooking or boiling operation, removing the material from the cooker or boiler and subjecting the same to pressure to extract moisture therefrom, then conveying the material through an open-ended vat containing a hot binding and preservative agent to convert the remaining moisture in the pores of the material into steam to open up the pores and cause the binding and preservative agent to enter the pores vacated by the moisture, subjecting the vat to a suction during passage of the material through the vat so as to draw the steam vapors out of the vat, and finally compressing the material.

3. The herein described process which consists in carrying wet fibrous material through a vat containing a hot binding and preservative agent with the material submerged in the binding and preservative agent, so as to convert the moisture in the material into steam and to impregnate the material with the hot binding and preservative agent, drawing the steam vapors out of the vat during said impregnation, and finally subjecting the material to pressure.

4. The herein described process of treating fibrous vegetable material which consists in subjecting the same to a cooking or boiling operation in the presence of water for a predetermined period, then removing the material from the cooker or boiler, then while the material is hot extracting moisture from the same, then subjecting the material to the action of a hot binding and preservative agent in a vat to convert the remaining moisture in the material into steam and to impregnate the pores made vacant by the escape of the moisture from the material with the binding and preservative agent, drawing the steam vapors out of the vat during said impregnation, finally removing the impregnated material from the vat, and mixing fireproof material therewith.

5. The herein described process which consists in carrying wet fibrous material through a bath of hot asphalt out of contact with the bottom of the bath, so as to convert the moisture in the material into steam and to impregnate the material with the hot asphalt.

6. The herein described process of treating fibrous material which consists in subjecting the same to a cooking or boiling operation, removing the material from the cooker or boiler and while in a hot and wet condition carrying the same through a bath composed of a hot binding and preservative agent with the material carried wholly away from the bottom of the bath, so as to convert the moisture in the material into steam and to impregnate the material with the binding and preservative agent.

7. The herein described process of treating fibrous material which consists in subjecting the same to a cooking or boiling operation, removing the material from the cooker or boiler and while in a hot and wet condition carrying the same through a bath composed of a hot binding and preservative agent with the material carried wholly away from the bottom of the bath, so as to convert the moisture in the material into steam and to impregnate the material with the binding and preservative agent, subjecting the vat to suction during the passage of the material through the bath so as to draw the steam vapors out of the vat, and finally compressing the material.

8. The herein described process which consists in subjecting fibrous material to a cooking or boiling operation, removing the material from the cooker or boiler and while in a wet condition subjecting the same to pressure to extract surplus moisture therefrom, then introducing the fibrous material in a wet condition into a vat containing a hot binding and preservative agent, so as to convert the remaining moisture in the material into steam and to impregnate the material with the binding and preservative agent.

9. The herein described process which consists in subjecting wet fibrous material to pressure to extract a certain percentage of moisture from the material, then introducing the wet fibrous material into a vat containing a hot binding and preservative agent so as to convert the remaining moisture in the material into steam and to impregnate the material with the binding and preservative agent.

10. The herein described process which consists in introducing wet fibrous material into a vat containing a bath including a hot binding and preservative agent with the wet fibrous material submerged in said bath so as to convert the moisture in the material into steam and to impregnate the fibrous material with the binding and preserving agent, removing the fibrous material from the vat, and while in a heated condition, subjecting the same to pressure.

In testimony whereof I affix my signature in presence of two witnesses.

JOHN E. CLARK.

Witnesses:
  JOHN H. SIGGERS,
  GEO. C. SHOEMAKER.